Feb. 6, 1934.   K. L. HERRMANN   1,946,440
APPARATUS AND METHOD OF FINISHING ROLLERS
Filed Nov. 17, 1933
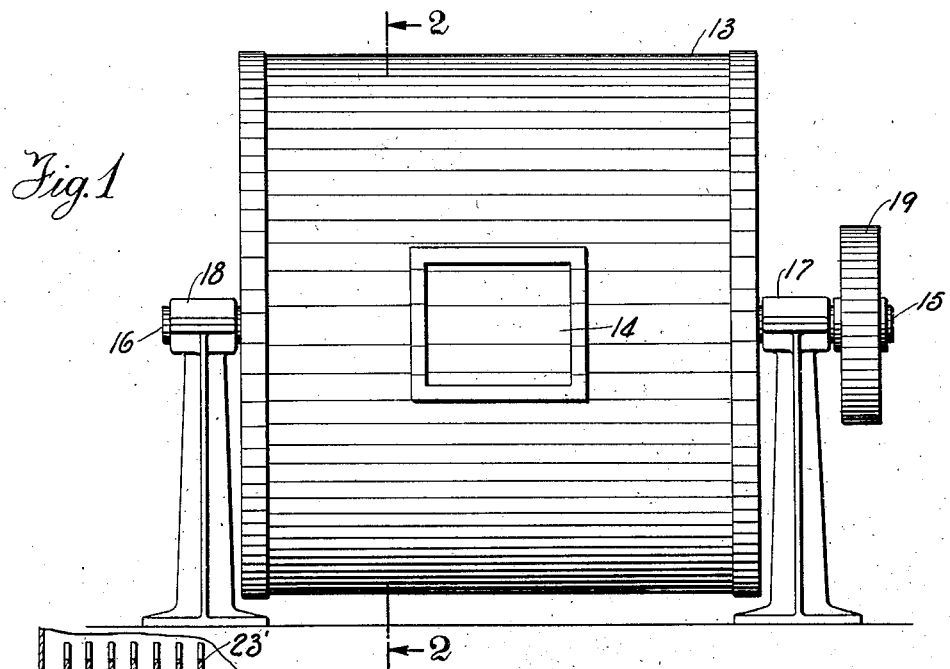
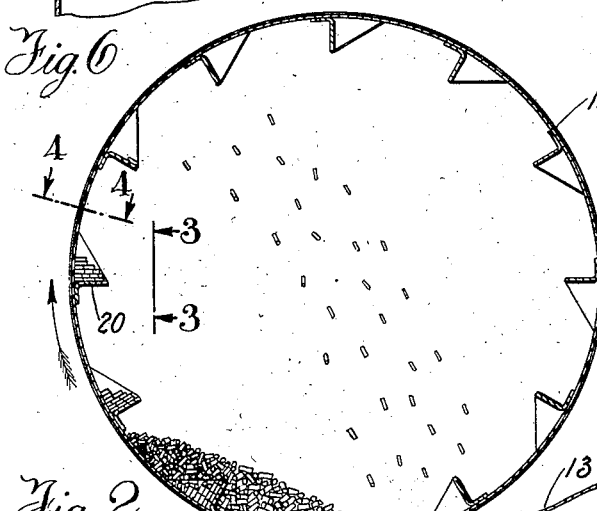
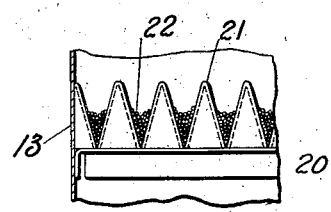
Fig. 3
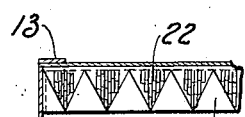
Fig. 4
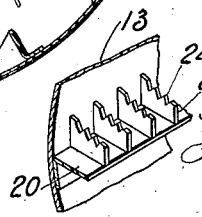
Fig. 5
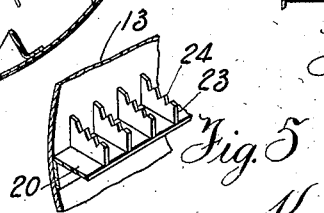
Fig. 7   Fig. 8   Fig. 9
INVENTOR.
Karl L. Herrmann
BY
ATTORNEYS.

Patented Feb. 6, 1934

1,946,440

UNITED STATES PATENT OFFICE 1,946,440

APPARATUS AND METHOD OF FINISHING ROLLERS

Karl L. Herrmann, South Bend, Ind., assignor to The Bantam Ball Bearing Company, South Bend, Ind., a corporation of Indiana Application November 17, 1933
Serial No. 698,503

9 Claims. (Cl. 51—164)

This application is a continuation in part of my co-pending application Serial No. 644,980, filed November 30, 1932, and relates to apparatus and an improved method of manufacturing roller bearings, and particularly to improvements in the apparatus and method of manufacturing small rollers known as needle bearings, and has for its principal object the provision of an improved apparatus and method for rapidly and economically rounding the ends and smoothing the corners of the rollers of the character described.

A further object lies in the provision of apparatus and a method for tumbling rollers wherein the ends of such rollers are rounded and polished, and the cylindrical faces of the rollers adjacent to the ends are smoothed off before the rollers are ground to size.

A still further object is to provide a tumbling barrel which will throw the rollers so that the ends thereof strike against an impact surface for rounding the ends of the rollers.

A further object of the invention is to provide a tumbling barrel so constructed that the ends of the rollers will strike against an impact surface after which the rollers are moved or jostled about to wear away the upset portions of the rollers due to the striking of the ends of the rollers against the impact surfaces.

Still another object is to provide blades or fins in the tumbling barrel positioned and shaped to stack the rollers so that they slide off the blades or fins in an endwise direction and thus strike head-on against an impact surface as the barrel is being rotated.

The accompanying drawing is illustrative of suitable apparatus and the method of carrying out my invention. The drawing, however, is to be taken as illustrative only and not as limiting the invention, the scope of which is to be measured entirely by the scope of the sub-joined claims.

In the drawing in which like numerals refer to like parts throughout the several views, Fig. 1 is an elevational view of a tumbling mill used in carrying out my improved method referred to above.

Fig. 2 is a sectional view on the line 2—2 of Fig. 1, looking in the direction of the arrows.

Fig. 3 is an enlarged fragmentary elevational view, looking in the direction of the arrows 3—3 of Fig. 2, showing one of the ribs for elevating the roller blanks and for keeping the blanks in proper alignment while being elevated.

Fig. 4 is a sectional view taken on the line 4—4 of Fig. 2, illustrating further the elevating rib.

Fig. 5 is a perspective view showing a modified form of the partitions for keeping the roller blanks in proper alignment while being elevated.

Fig. 6 is a sectional view similar to Fig. 3, showing still another form of partitions which may be used for the purpose specified.

Fig. 7 is an elevational view of a roller blank as it is first cut from stock and placed in the tumbling barrel.

Fig. 8 is an elevational view of a roller blank in its partly finished state.

Fig. 9 is an elevational view of the finished roller in condition for finished grinding.

In my present invention, the roller blanks are preferably of relatively soft steel which are subjected to a series of knocking actions so that the corners of the metal at the end of the rollers are upset a small amount by each knocking action. However, intermediate each knocking action, the rollers are tumbled or jostled about so that the upset corners of the metal at the ends of the rollers are worn away and rounded off and the cylindrical faces of the rollers are maintained substantially uniform throughout their length during the time required for rounding the ends of the rollers.

In carrying out my invention, the roller blanks are cut from stock by any convenient or conventional method, the blanks as illustrated in Fig. 7 preferably having a diameter greater than the diameter of the finished roller and having ends which are rough and which may have sharp edges as indicated at 11 or extensions as indicated at 12.

A quantity of these rough roller blanks, depending on the size of the tumbling barrel, are deposited in the barrel 13, as illustrated in Fig. 1, through a slide door 14 or other convenient or conventional aperture. The barrel 13 may have stub shafts 15 and 16 extending from the opposite ends thereof, the same being supported in journal bearings 17 and 18, and the shafts and consequently the barrel may be rotated by any suitable power means such as the belt-pulley 19. Within the barrel 13, I provide a plurality of substantially equally spaced longitudinally extending fins or ribs 20 which are preferably formed of iron bars of an L or angle cross section, the same being riveted, welded or otherwise secured to the interior of the barrel 13. I also preferably provide a series of partitions, one form of which is illustrated in Figs. 3 and 4, the same having inclined sides 21 providing pockets 22 therebetween and which may be secured in any suitable manner to the ribs 20 and to the barrel 13 for a purpose to be hereinafter described.

In Fig. 5, I have illustrated spaced partitions 23 having serrated faces 24 and in Fig. 6 the spaced partitions 23' may have plain exposed faces. In any of the forms as illustrated in Figs. 3 to 6 inclusive, it is preferred that the partitions are so arranged and spaced on the fins 20 that as the roller blanks are picked up due to the rotation of the barrel 13 that the blanks will assemble in rows of piles as illustrated in Figs. 3 and 4 in order that they may slide off the fins 20 in an endwise direction to thereby strike head-on against the inner face of the barrel as illustrated in Fig. 2.

In Figs. 3 and 4 the partitions having the inclined sides 21 provide the pockets 22. Due to the rotation of the barrel 13, as the roller blanks are picked up by the fins 20, they will tend to stack up in piles so that their longitudinal axes are perpendicular to the face of the barrel at that point for the purpose heretofore described. In Fig. 5, the serrated partitions 23 are preferably spaced so that the space between the respective partitions is less than the length of the blanks being operated upon. Should the blanks not stack up as evenly as illustrated in Fig. 3 and should any of the blanks overlap any of the partitions, the serrations 24 will tend to retard that end of the roller as it falls from its elevated position and cause the same to fall in a lengthwise direction to therefore strike head-on against the impact surface. Also in Fig. 6, the partitions are preferably spaced so that the spaces therebetween are less than the length of the blanks to thus assist in assembling the blanks in such a manner that they will fall in an endwise direction as in the other modifications.

As illustrated in Fig. 2, when a quantity of roller blanks are placed in the tumbling barrel and the barrel is rotated the blanks will be picked up from the bottom of the barrel by the fins or ribs 20 and carried to a position adjacent to the top of the barrel where they will be discharged from the fins or ribs and fall back against the barrel in the manner somewhat as illustrated. The series of partitions formed on the ribs 20 are preferably so formed that the roller blanks will lay in the pockets 22 between the partitions in rows somewhat as illustrated in Figs. 3 and 4. With the rollers placed in rows or piles as illustrated, and are elevated to the top of the barrel, they will slide out of the pockets in an end-wise direction and thus be driven against the side of the barrel remote from the discharge point so that the ends of the rollers will strike head-on.

It is essential in this connection that the barrel should have a diameter greater than a predetermined limit so that as the rollers fall from the uppermost position to the bottom of the barrel, each roller will acquire a sufficient gravity velocity to create a material impact upon the ends of the blanks which strike the bottom of the tumbling barrel. Also, the rollers must tumble for a sufficient length of time to completely round and smooth the ends thereof, as illustrated in Fig. 8, in the partly finished state, and in Fig. 9, as the finished roller. I have found in practice that if the blanks are tumbled in a tumbling barrel having a diameter of approximately four feet for a period of from thirty-six to forty-eight hours, excellent results may be obtained by this method. The invention is not limited, however, to the exact dimensions of the tumbling barrel, nor to the exact period of time mentioned as it is obvious that at least satisfactory results may be obtained by tumbling the blanks in a larger barrel for a shorter period, or by tumbling them in a somewhat smaller barrel for a longer period. Furthermore, the size and weight of the blanks to be finished will necessarily govern the length of time which the blanks must be tumbled. The rollers are thus successively rounded and finished so that it is not necessary to grind any upset portion of the rollers after they leave the tumbling barrel.

Immediately after each roller is discharged from the fins at the top of the barrel due to the rotation thereof, against the opposite side of the tumbling barrel, the rollers are jostled and tumbled, as illustrated in Fig. 2 so that any upset portions caused by the impact on the end of the roller against the barrel is worn and smoothed off. The fins 20 aside from elevating the rollers when the barrel is rotated as indicated by the arrow in Fig. 2, aid in tumbling and jostling the rollers as they pile up at the bottom of the barrel as illustrated at A to assist in wearing away any upset portions thereon. In fact, I have found that under some conditions the jostling and tumbling of the rollers will, in addition to the wearing away of the upset portions, wear away the portions of the roller immediately adjacent to the ends thereof to slightly under size, or to a size slightly smaller than the diameter of the remainder of the roller, which for some types of bearings is of material advantage.

Referring particularly to my improved method of finishing rollers, I have described a tumbling barrel as a preferred apparatus therefor but it will be apparent that satisfactory results may be accomplished with other apparatus since in its broad sense the method is limited only to the means for providing smooth rounded ends on the roller blanks by means of a series of impacts accompanied by giving the roller blanks a velocity and allowing them to strike against a hard surface, and also the finishing of, or wearing of, the upset portion of the roller blanks between each successive impact of the roller against the impact surface. The velocity given the roller blanks may be due to gravity as in the case of tumbling the blanks in the tumbling barrel as described above, or by gravity velocity imparted to the roller blanks by lifting them in an elevator and permitting them to fall from an elevated position to a hard surface. However, as the latter method forms the subject matter of a separate application for patent, the same will not be described in detail in this specification.

It will be understood, of course, that various other methods of imparting gravity velocity to the rollers blanks and allowing them to impinge against the hard surface may be resorted to without departing from the scope of my improved method as set forth. It is also within the scope of my invention to impart a velocity other than a gravity velocity to the blanks such, for instance, as a velocity incident to a centrifugal force. Thus, the blanks may be whirled in a centrifugal machine and allowed to volley from the machine and impinge against the hard surface adjacent thereto.

Carrying out the preferred form of my invention which includes the apparatus and the method of forming the rollers, it will be apparent that the tumbling barrel must be rotated at a speed such that the roller blanks will fall from the upper to the lower position of the barrel and will not lie against the sides of the barrel by reason of an excessive amount of centrifugal force. When the rollers are taken from the barrel, it will be found that both the ends of these blanks are rounded and that the corners have been smoothed off, as illustrated in Fig. 9, so that the same are ready for the finished grinding.

Other steps such as heat treating, grinding and polishing of the rollers may be added to the process of manufacturing the same without affecting the novelty of my improved method of tumbling the roller blanks to provide rounded and smooth ends thereon as described above.

Having now described my invention both as to apparatus and method so that others skilled in the art may clearly understand the same, what I desire to secure by Letters Patent is as follows.

What I claim is:

1. The process of forming smooth rounded ends on rollers for roller bearings which comprises, picking up the rollers from the bottom of a tumbling barrel, carrying the rollers to a position adjacent to the top of the barrel, discharging the rollers in an end-wise direction so that they will strike end-wise against the barrel at a point removed from the discharge point, and subsequently grinding said rollers to finished size.

2. The process of forming smooth rounded ends on rollers for roller bearings which comprises, picking up the rollers from the bottom of a tumbling barrel, carrying the rollers to a position adjacent to the top of the barrel, and discharging the rollers in a manner so that they will strike end-wise against the barrel at a point removed from the discharge point.

3. The process of forming smooth rounded ends on rollers for roller bearings which comprises, picking up the rollers from the bottom of a tumbling barrel, carrying the rollers to a position adjacent to the top of the barrel, discharging the rollers in a manner so that they will strike end-wise against the barrel at a point removed from the discharge point, and jostling said rollers to remove any upset portions thereof after each striking operation.

4. The process of forming smooth rounded ends on rollers for roller bearings which comprises, elevating the rollers, discharging the rollers in a manner so that they will strike head-on against an impact surface, and tumbling said rollers to remove the upset portions thereof after each striking operation.

5. The method of forming smooth rounded ends on rollers for roller bearings, which comprises, successively striking the rollers against an impact surface and tumbling the rollers until the ends and corners are rounded and the bearing surface is cylindrical.

6. A machine for rounding the ends of rollers comprising, a rotatable barrel, spaced fins on the inside of said barrel, and partitions on said fins causing said rollers to be stacked in rows in the pockets formed therebetween whereby said rollers will be discharged therefrom to strike head-on against the inner face of said barrel.

7. A machine for rounding the ends of rollers comprising, a rotatable barrel, fins secured to the inside of said barrel, and V-shaped partitions on said fins causing the rollers to be stacked in rows in the pockets formed between said partitions to cause discharge of the rollers in an end-wise direction against the inner face of said barrel.

8. A machine for rounding the ends of rollers comprising, means for elevating said rollers, means for arranging said rollers to permit discharge thereof in an end-wise direction against an impact surface, and means to tumble said rollers to wear off any upset portion thereof.

9. A machine for rounding the ends of rollers comprising, a rotatable barrel, fins attached to the inner face of said barrel, and spaced partitions secured to said fins, the pockets between said partitions being shorter than said rollers whereby said rollers are caused to lay therein with their longitudinal axis perpendicular to the face of the barrel at that point.

KARL L. HERRMANN.